(12) United States Patent
Kumar et al.

(10) Patent No.: US 11,217,005 B1
(45) Date of Patent: Jan. 4, 2022

(54) TECHNIQUES FOR RENDERING 2D VECTOR GRAPHICS ON MOBILE DEVICES

(71) Applicant: Adobe Inc., San Jose, CA (US)

(72) Inventors: Harish Kumar, Uttar Pradesh (IN); Himanshu Aggarwal, Delhi (IN); Akshit Verma, Delhi (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/989,501

(22) Filed: Aug. 10, 2020

(51) Int. Cl.
 *G06T 15/00* (2011.01)
 *G06T 17/20* (2006.01)
(52) U.S. Cl.
 CPC ............ *G06T 15/005* (2013.01); *G06T 17/20* (2013.01)
(58) Field of Classification Search
 None
 See application file for complete search history.

(56) References Cited

U.S. PATENT DOCUMENTS

| 2014/0043342 A1* | 2/2014 | Goel | G06T 11/203 345/501 |
| 2015/0062142 A1* | 3/2015 | Goel | G06T 15/005 345/582 |
| 2016/0379333 A1* | 12/2016 | Krutsch | G06T 1/20 345/506 |

* cited by examiner

*Primary Examiner* — Michelle Chin
(74) *Attorney, Agent, or Firm* — NDWE LLP

(57) ABSTRACT

Embodiments are disclosed for efficiently rendering vector graphics in a single rendering pass on tile-based GPUs. In particular, in one or more embodiments, the disclosed systems and methods comprise receiving at least one segment of a vector-based object to be rendered, generating, by a central processing unit (CPU) of a computing device, a representation of the at least one segment, the representation including a plurality of primitives, including a plurality of coverage primitives and a plurality of color primitives, generating, by a graphics processing unit (GPU) of the computing device, a plurality of fragments based at least on the representation of the at least one segment, and rendering, by the GPU of the computing device, the plurality of fragments in a single pass using a rendering state machine.

20 Claims, 10 Drawing Sheets

TECHNIQUES FOR RENDERING 2D VECTOR GRAPHICS ON MOBILE DEVICES

BACKGROUND

1. Technical Field

The present disclosure relates generally to systems and method for rendering vector graphics images. More specifically, one or more embodiments of the present disclosure relate to systems and methods that enable efficient rendering of geometry in a vector graphics image in a single pass using tile-based graphics processing units.

2. Background and Relevant Art

Conventional computer graphic systems enable users to create various types of computer graphics content such as free form illustration, engineering design, or other types of technical or non-technical computer graphics. In addition, conventional systems often employ a graphics rendering model called a graphics pipeline to display two-dimensional and three-dimensional data on a display. A typical graphics pipeline generally includes processing data using both a central processing unit (CPU) and graphics processing unit (GPU) of a computing device. As one example, the CPU first processes data associated with a Bezier curve. This data is passed to the GPU to graphically render the data on a display.

In general, conventional systems employ one of two approaches to render deformable vector graphics: stencil then cover or tessellation-based techniques. In the stencil then cover approach, triangles are generated for an input vector shape and are rasterized into a stencil buffer in one render pass (e.g., a stencil pass), and then a bounding box of the input shape is rasterized in a second render pass (e.g., a cover pass) into the output buffer based on values stored in the stencil buffer for each rasterized fragment (e.g., pixel). These techniques rely on multisampling for anti-aliasing vector content. Dependence on multisampling results in an increase in memory usage of applications based on the number of samples per pixel that must be generated to achieve an adequate appearance. This becomes a major performance bottleneck on devices having low GPU memory, such as mobile devices. Further, multisampling forces blend modes to be executed per sample instead of per pixel leading to further performance degradation in real world illustrations. Generally, an 8× multisampling factor (e.g., 8 samples per pixel) is required for acceptable antialiasing quality. As such, multisampling becomes a major bottleneck in using these techniques for real world vector applications.

The other approach that conventional systems use are tessellation-based techniques which generate a tightly bound triangle mesh. This triangle mesh has interior triangles (e.g., triangles bounded by lines) and boundary triangles (e.g., triangles bounded by curves). These techniques do not rely on multisampling for anti-aliasing but rely on signed distance-based techniques to produce an anti-aliased appearance. As such, the memory requirement is less compared to the stencil then cover approach. However, the tessellation step is computationally expensive and results in low performance in user workflows such as creating vector art, editing the shape of the art, etc., since every edit to a given shape require re-tessellation and results in slow frame rates in such operations.

These and other problems exist with regard to rendering vector graphics.

BRIEF SUMMARY

Introduced here are techniques/technologies for efficiently rendering vector graphics in a single rendering pass on tile-based GPUs. In particular, in one or more embodiments, the disclosed systems and methods comprise receiving at least one segment of a vector-based object to be rendered, generating, by a central processing unit (CPU) of a computing device, a representation of the at least one segment, the representation including a plurality of primitives, including a plurality of coverage primitives and a plurality of color primitives, generating, by a graphics processing unit (GPU) of the computing device, a plurality of fragments based at least on the representation of the at least one segment, and rendering, by the GPU of the computing device, the plurality of fragments in a single pass using a rendering state machine.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

One or more embodiments of the present disclosure include a content design system that enables rendering anti-aliased vector paths natively on tile-based graphics processing units (GPUs), such as those used in mobile devices. In some embodiments, a vector graphics object (e.g., lines, Bezier curves, etc.) can be rendered in a single pass without multisampling. To render a vector graphics object, a simple tessellation step can be performed to generate a data representation of the vector graphics object as sets of potentially overlapping primitives. This allows tessellation to be performed quickly.

For example, the vector graphics object may be represented as triangles or other polygons. These primitives may include coverage primitives and color primitives. These primitives can be rasterized to generate fragments (e.g., pixels). The fragments are processed using a rendering state machine, which first processes coverage fragments followed by color fragments from a linear memory. The rendering state machine updates a coverage buffer based on a coverage value of the fragment being processed and the current state of the coverage buffer, then combines the coverage values from the coverage buffer with color values from the color buffer to render anti-aliased vector paths in a single rendering pass.

The disclosed techniques result in improvements in memory usage and performance over existing techniques. For example, unlike traditional stencil then cover approaches, embodiments provide a single sampled rendering technique which use a simple tessellation scheme allowing vector graphics to be edited at a high frame rate. Additionally, embodiments resolve overlapping geometry as well as anti-alias the boundary curves in parallel on GPU. Due to single-sampling, embodiments result in a significant reduction in memory usage compared to conventional techniques.

Additionally, unlike traditional standard 'stencil and cover' paradigm-based techniques which use multisample-based anti-aliasing, embodiments use coverage-based anti-aliasing techniques where an offset spread is generated around the Bezier segment and alpha (e.g., opacity) is modulated near the Bezier segment based on a signed distance of the pixel from the quadratic segment. This provides an anti-aliased appearance without the memory requirements of multisampling.

Figure 1:
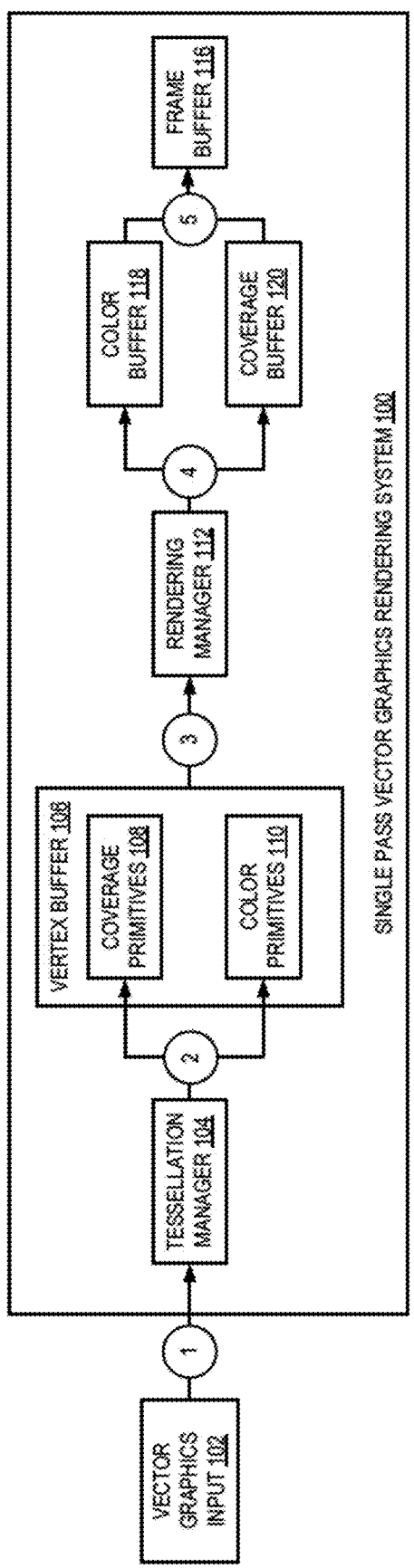
FIG. 1 illustrates a diagram of a process of single pass vector graphics rendering in accordance with one or more embodiments.

FIG. 1 illustrates a diagram of a process of single pass vector graphics rendering in accordance with one or more embodiments. As shown in FIG. 1, a single pass vector rendering system 100 can manage the rendering of vector graphics input(s) 102. In various embodiments, single pass vector graphics rendering system 100 (or simply, "rendering system" 100) can be implemented as part of a vector graphics application and can execute on a computing device. As discussed, the rendering system 100 is configured to take advantage of features of tile-based graphics processing units (GPUs) to render vector graphics using less memory and providing better performance than conventional techniques. As such, the rendering system may be implemented in a vector graphics application running on any computing device having one or more tile-based GPUs. Additionally, although reference is made to implementation on tile-based GPUs, embodiments may be used with any tile-based accelerator.

When a designer creates an image using a content design system, the designer can create a raster image (e.g., where information for every pixel of the image is stored) or a vector image (e.g., where vectors that describe the geometry of the image are stored). For example, if a designer designs a rectangle, this can be stored as four points (e.g., the four corners of the rectangle) that are used to render the rectangle, rather than storing data for every pixel in the drawing where the rectangle appears. This similarly applies for more complicated shapes like curves. To render the vectors, the system can then compute the pixels that a given vector object covers. As the vector graphics get more complex, performance degrades. This performance degradation is amplified on devices with fewer resources, such as mobile devices.

As shown in FIG. 1, one or more vector graphics object(s) 102 can be input to the rendering system at numeral 1. The vector graphics objects may include one or more lines, curves, or combinations of lines and curves having simple or complex geometry. In some embodiments, the vector graphics may be input to the rendering system 100 via one or more draw calls (or a batch of draw calls) to a graphics application programming interface (API). The first phase of rendering of the vector graphics input 102 is tessellation. Tessellation manager 104 can receive the vector graphics input 102 and tessellate the input. As discussed further below, this may include splitting the input into primitives (e.g., triangles or other polygons) which can be processed by a GPU. The tessellation manager 104, at numeral 2, generates two types of primitives and stores them in vertex buffer 106. These include coverage primitives 108 and color primitives 110. The coverage primitives 108 include control triangles which include the vector graphics (e.g., curves, lines, etc.) and interior primitives which do not include the vector graphics. The color primitives may be generated by forming a bounding box around the vector graphics and dividing it in two, creating two color triangles, regardless of vector complexity. As discussed below, the coverage primitives and color primitives generated for multiple draw calls can be packed in the vertex buffer to allow for rendering to be performed in a single pass.

The vertex buffer can be read by rendering manager 112 at numeral 3. The rendering manager can take the primitives from the vertex buffer 106 and generate a raster that can be rendered on a display. The rendering manager can manage a programmable graphics pipeline to render the input vector object. For example, the vertex buffer can be read by a vertex shader and the primitive vertices can be transformed to device space. These vertices can be passed to a rasterizer to generate fragments from the primitives in the vertex buffer. Each fragment corresponds to a single pixel and may be categorized as coverage fragments or color fragments, depending on the type of triangle they were derived from.

The rendering manager 112 can allocate a frame buffer 116 which includes a color buffer 118 attachment and a coverage buffer 120 attachment. The coverage buffer 120 transiently stores the coverage of each pixel that is covered by the shape of the vector object being drawn. The color buffer 118 stores the final color for each pixel to be displayed on the screen. The rendering manager 112 uses a rendering state machine that defines transitions in the state of the frame buffer 116 (also referred to herein as "pixel memory) depending on the current state and the current fragment type being processed.

The frame buffer is the size of the display and stores a value for each pixel to be rendered on the display. The color buffer 118 and coverage buffer 120 are each also the same size as the frame buffer. In some embodiments, the color buffer is of RGBA32 format and so stores 32 bits for each pixel to store the final color to be displayed. The coverage buffer may be of R8 format, which stores 8 bits per pixel to represent the coverage of the input vector geometry. In various embodiments, alternative formats for the color buffer and coverage buffer may also be used, depending on implementation.

The vertex buffer 106 may be a linear memory and may include the coverage fragments and color fragments of each segment of a vector graphic to be drawn in sequence. For example, and as discussed further below, the vertex buffer 106 can include the coverage fragments of segment 1, followed by the color fragments of segment 1, followed by the coverage fragments of segments 2, followed by the color fragments of segment 2, and so on. A fragment shader processes the fragments in order from the vertex buffer and the state machine determines the appropriate values to write to the color buffer 118 and coverage buffer 120 based on the current state of the frame buffer and the type of fragment being processed, as discussed further below.

For example, the coverage fragments of segment 1 are processed and coverage buffer 120 is populated. Then the color fragments of segment 1 are processed and the color buffer is populated. The values of the coverage buffer and color buffer are combined to determine the final output values for the frame buffer 116 at numeral 5. As discussed further below, the disclosed techniques render vector graphics in a single pass and provide anti-aliasing without multisampling. This significantly reduces the resource requirements, most particularly memory, and increases rendering performance on tile-based GPUs.

Figure 2:
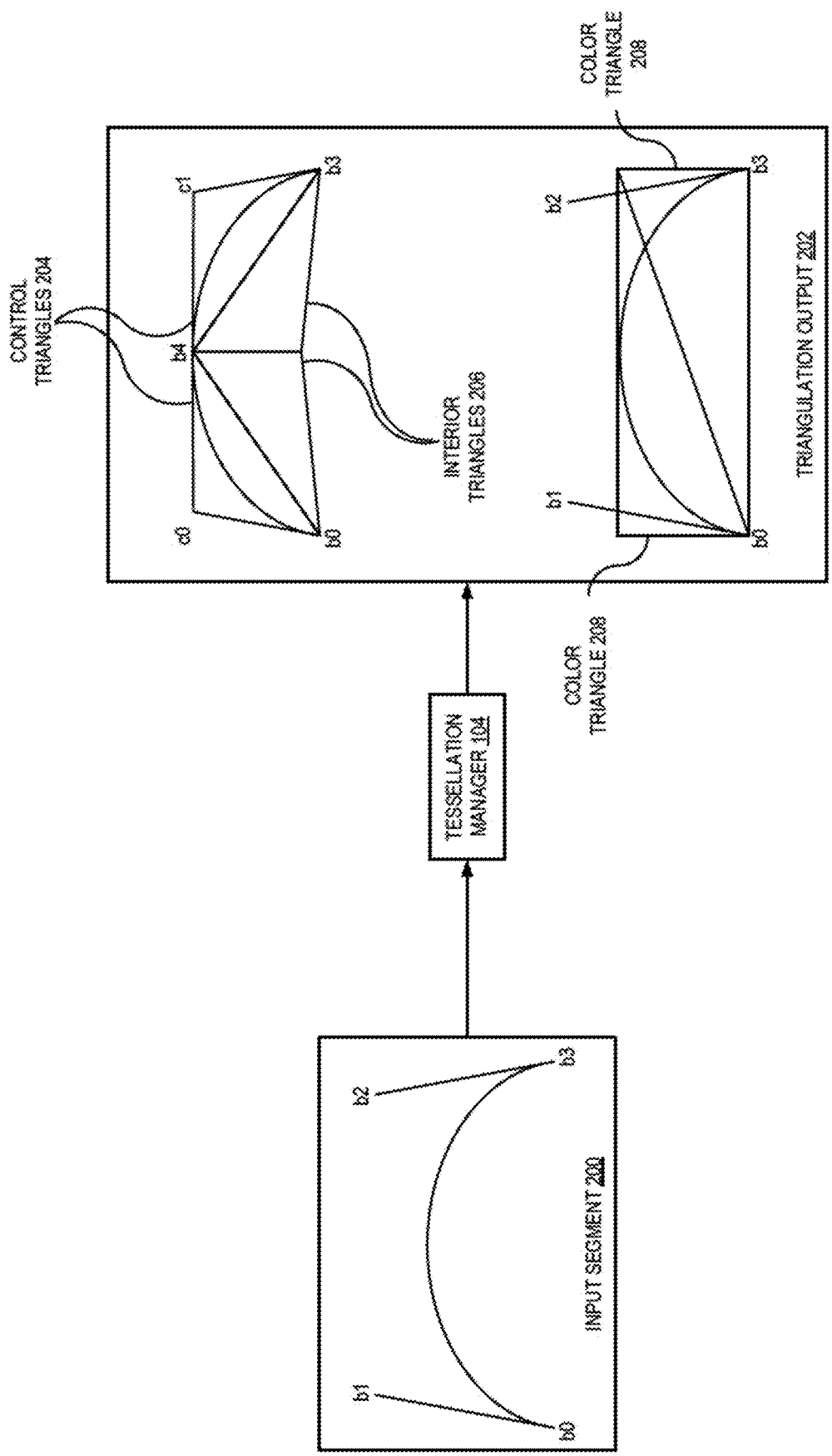
FIG. 2 illustrates a diagram illustrating tessellation in accordance with one or more embodiments.

FIG. 2 illustrates a diagram illustrating tessellation in accordance with one or more embodiments. As discussed above, the first step of the rendering process can include tessellation of an input vector graphic. In the example of FIG. 2, an input segment 200, such as the depicted Bezier curve, can be provided to tessellation manager 104. Tessellation manager 104 can perform triangulation of the geometry of the vector object. In some embodiments, tessellation may be performed using a central processing unit (CPU) of a computing device. In some embodiments, tessellation may include splitting cubic Bezier curves into quadratic Bezier curves and then triangulating the region. Although the example of FIG. 2 tessellates using triangle primitives, in various embodiments other primitives, such as other polygons, may be used depending on the GPU used.

Tessellation manager 104 produces triangulation output 202 which may include both coverage triangles and color triangles. As discussed, coverage triangles may include control triangles 204 and interior triangles 206. To generate coverage triangles, tessellation manager 104 approximates any cubic Bezier curves using quadratic Bezier curves. For example, input cubic Bezier curve 200 defined by points b0-b3 can be approximated into a quadratic Bezier curve defined by points b0, b3, and b4. Then a polygon is constructed by joining contiguous pairs of end points of the quadratic Bezier curves. For example, an interior triangle is formed by connecting b0 to b4 and a third point orthogonal to b4 and a second interior triangle is similarly formed by connecting b4 to b3 and the third point orthogonal to b4. As these triangles do not include the curve, these are interior triangles 206.

Control triangles 204 are constructed similarly by connecting contiguous endpoints and then connecting to points c0 and c1, such that the resulting control triangles 204 fully encapsulate the curve. In some embodiments, to accommodate anti-aliasing, control triangles are expanded (e.g., by one or more pixels) to cover enough pixels around the boundary of curve to avoid any aliasing artifacts due to under-coverage. The coverage triangles may also overlap with each other. During the GPU render phase, discussed below, overlaps are resolved such that only one pixel is marked for cases where triangles overlap and any pixels where triangles expand outside the shape are discarded. For example, on complex geometries, triangles may overlap a given area multiple times. One technique for resolving these overlaps is to discard pixels from an area that is overlapped an even number of times and keep pixels from any area that is overlapped an odd number of times. This simplifies the tessellation as it does not need to guarantee no overlaps between primitives.

As discussed, triangulation output 202 may further include color triangles 208. Where coverage triangles define where the input geometry (e.g., input segment 200 or other vector graphic input) appears in an image, color triangles 208 define the color of the input geometry. As shown in FIG. 2, regardless of the simplicity or complexity of the geometry of the input shape, tessellation manager produces two color triangles. For example, although a simple curve is shown in FIG. 2, more complex shapes would also result in two color triangles being produced. The two color triangles are generated by splitting a bounding box around the input geometry in two halves along the diagonal, as shown in FIG. 2.

Figure 3:
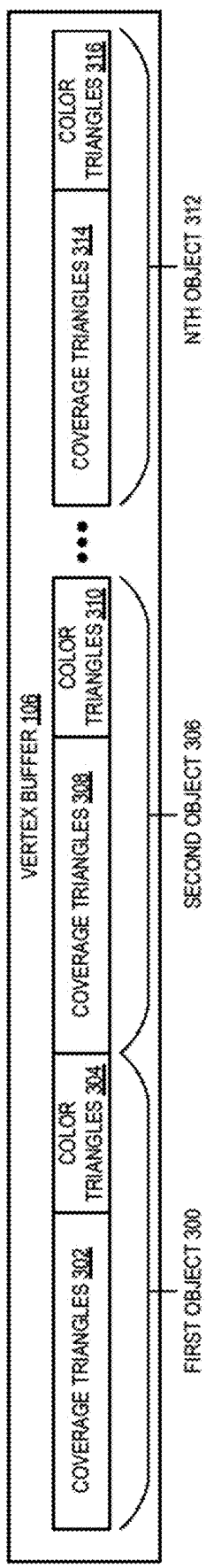
FIG. 3 illustrates a diagram of an efficiently packed vertex buffer in accordance with one or more embodiments.

FIG. 3 illustrates a diagram of an efficiently packed vertex buffer in accordance with one or more embodiments. As discussed, vertex buffer 106 is a linear memory. This allows the vertex buffer to be packed in such a way that different triangles are processed in a predictable order. GPUs work most efficiently when multiple draw calls are batched, rather than called individually. For example, if there are ten segments to be drawn, the most efficient way to utilize the GPU is to provide draw calls for all ten segments together in a single batch. The draw calls can then be processed by the GPU in parallel, increasing the utilization of available threads in the GPU and improving overall efficiency of execution.

In the example of FIG. 3, the vertex buffer 106 has been packed with triangles for three vector objects: first object 300, second object 306, and Nth object 312. As shown, these are packed for each object such that the color buffer is always appended to the end of the coverage buffer (e.g., the color triangles always follow the coverage triangles). For example, coverage triangles 302 for first object 300 are followed by color triangles 304. Coverage triangles 308 for second object 306 are appended to the end of the color triangles 304 of first object 300 and color triangles 310 are appended to the end of coverage triangles 308, and so on to the coverage triangles 314 and color triangles 316 for the Nth object 312. In some embodiments, a marker is placed in memory between each set of triangles. For example, a marker, such as a bit flag, may be placed between coverage triangles 302 and color triangles 304, and another marker placed between color triangles 304 and coverage triangles 308, and so on.

In some embodiments, the vertex buffer can be uploaded to GPU memory to be processed in the GPU render pass, as discussed further below.

Figure 4:
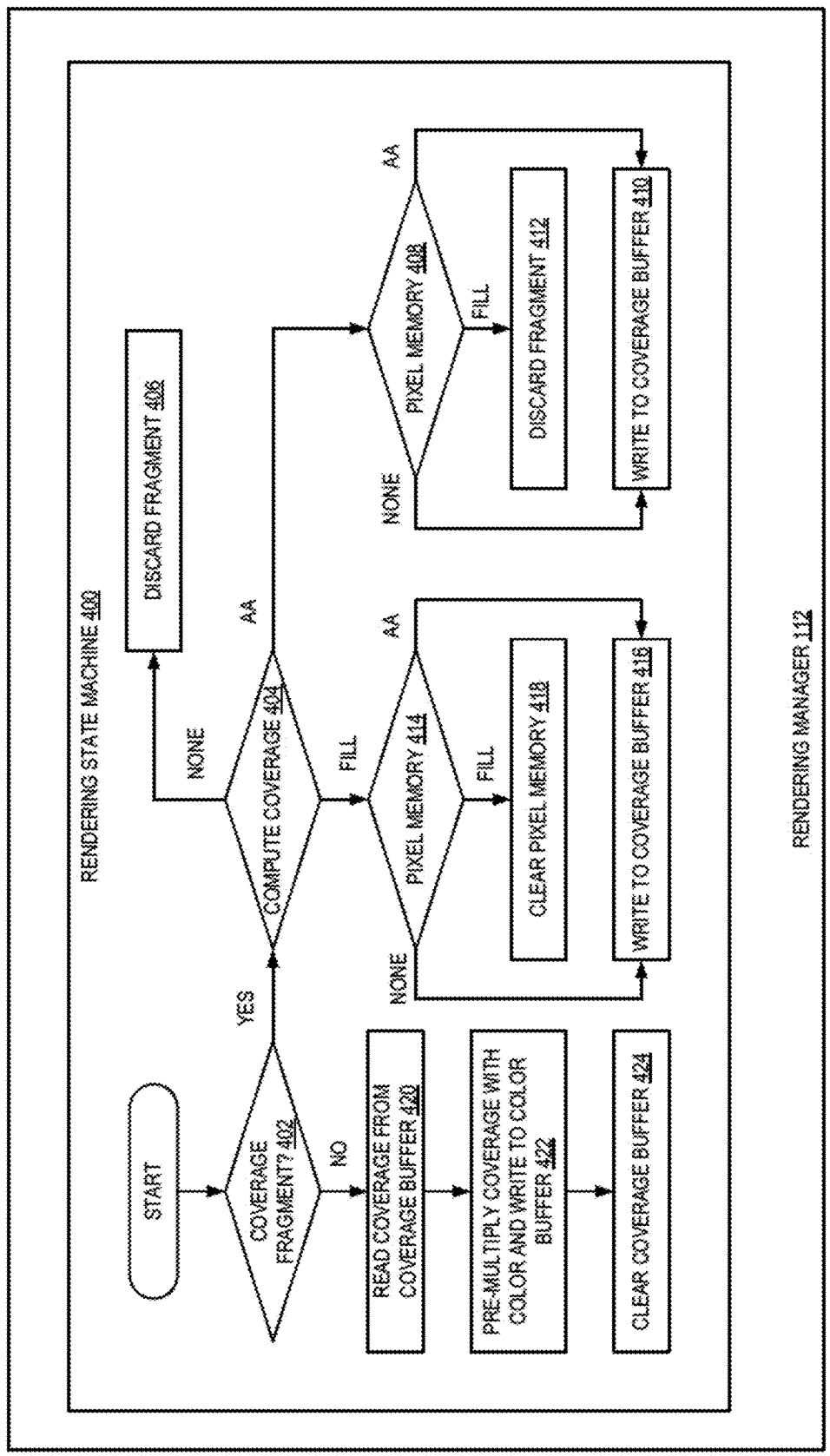
FIG. 4 illustrates diagram of a rendering state machine in accordance with one or more embodiments.

FIG. 4 illustrates diagram of a rendering state machine in accordance with one or more embodiments. As discussed, rendering manager 112 can include a rendering state machine 400 to process the fragments generated using the primitives packed into the vertex buffer into the frame buffer to be rendered on a display. As discussed, the rendering state machine 400 defines transitions in the state of pixel memory (e.g., the frame buffer) depending on two variables: the current state of the pixel memory and the current fragment type. Current fragment type refers to the type of fragment for which this invocation of fragment shader is being executed, and the fragment type is determined based on the primitive type from which a given fragment was rasterized. As such, there can be coverage fragments rasterized from coverage triangles, and color fragments rasterized from color triangles.

The coverage buffer's pixel value may include values [0,1]. Based on the pixel memory value, the pixel memory state for a given fragment can be one of: None, for example, where coverage=0; Fill, for example, where coverage=1; or Anti-Aliasing (AA), where, for example, coverage is a value between 0 and 1, exclusive. For each coverage fragment, the coverage value is determined based on the type of coverage fragment. For example, coverage fragments rasterized from interior triangles have a coverage value of 1. Control triangles include 'fill' fragments, where the coverage value equals 1, 'none' fragments, where the coverage=0, and 'AA' fragments where the coverage value falls between 0 and 1, exclusive.

In some embodiments, when computing coverage values, coverage based anti-aliasing techniques may be used to perform anti-aliasing on the vector geometry. In coverage based anti-aliasing, an offset spread is generated around a Bezier segment and alpha (e.g., opacity) is modulated near the Bezier segment based on a signed distance of the pixel from the Bezier segment. For example, standard techniques for calculating signed distance of a pixel from a Bezier segment may be used, such as described in "Random-Access Rendering of General Vector Graphics," D. Nehab et al., ACM Transactions on Graphics, Vol. 27, No. 5, Article 135, Publication date: December 2008, which is incorporated herein by reference for all purposes.

For example, for each fragment rasterized from a control triangle, the rendering system 100 determines whether the fragment lies on, inside, or outside of a segment based on rendering values. In some embodiments, the rendering system 100 uses k, 1, and m values to determine a fragment's location relative to a segment. For example, the rendering system 100 determines that a fragment lies on or within the segment when $k^3-lm<0$. When the fragment lies on the edge of the segment and/or within a threshold distance to the segment (e.g., within 2 pixels), the rendering system 100 can use the signed distance of the fragment (i.e., the distance between the fragment and the nearest point on the segment) to determine a fractional value (e.g., gradient level) at which to render the fragment. Based on the signed distance, the rendering system 100 applies a fractional coverage value to the fragment (e.g., between 0 and 1, exclusive) which affects the alpha modulation levels (e.g., transparency) of the pixel during rendering. If the signed distance is beyond a threshold value, then the rendering system 100 can set the fractional value to zero (e.g., no rendering).

Further, once the coverage value has been calculated for a fragment, it is written to the coverage buffer. This processing can continue until all coverage fragments have been processed. As discussed above, color fragments are appended to the end of coverage fragments, so color fragments are processed following coverage fragments. The color values of color fragments are similarly written to the color buffer and then the coverage values are cleared. By clearing the coverage values between processing different segments, overlapping vector objects can be rendered in a single draw call to fully utilize parallel computing power of the GPU.

When a draw call is issued, the coverage triangles and color triangles can be rasterized to generate fragments (e.g., pixels) for each of the triangles. These are packed in the vertex buffer as discussed above. Each fragment can then be processed by a fragment shader (e.g., pixel shader) of the GPU which reads the fragments from the vertex buffer. Using rendering state machine 400, the coverage buffer and color buffers can be written to based on existing values (if any) in the frame buffer and the type of fragment being processed.

As shown in FIG. 4, a fragment is read from the vertex buffer and it is determined at 402 whether the fragment is a coverage fragment. If this is a first fragment read from the vertex buffer, then it is a coverage fragment. Likewise, if a marker has not been read which indicates the end of the coverage fragments, then it is also a coverage fragment. If the fragment is a coverage fragment, then processing proceeds to block 404 and coverage is computed for the fragment. As discussed, a coverage fragment can not cover a pixel, totally cover a pixel, or partially cover a pixel. If the fragment is a control fragment, then a signed distance is calculated between the pixel and the line or curve being rendered. If the signed distance is greater than a threshold value, then the pixel falls outside the vector geometry and the coverage is 0 (e.g., 'none' as described above).

At block 406, any fragments determined to have a coverage value of 0 are discarded. If, however the signed distance is less than a threshold value, then the fragment is an anti-aliasing (AA) fragment, and a coverage value between 0 and 1, exclusive, is calculated based on the signed distance. For example, the threshold value may represent a fixed spread distance, d, which is allocated for anti-aliasing the vector graphic shape. This distance is typically in the range of a few pixels outside the vector graphic shape, though larger or smaller distances may be used. If the magnitude of the signed distance is greater than d, then the coverage value is 0 and if it is less than d, then the coverage value is calculated by linearly interpolating the signed distance between 0 and 1, exclusive.

Processing then proceeds to block 408 where the pixel memory (e.g., the frame buffer) is read. Reading the pixel memory on tile-based GPUs can be performed without a performance penalty, making checks of the pixel memory efficient. If the value for the corresponding pixel in pixel memory is 'none' (e.g., 0) then the coverage value computed at block 404 is written to the coverage buffer at block 410. If the value in pixel memory is an AA value (e.g., between 0 and 1), then the existing value in pixel memory is merged with the value computed at block 404 and written to the coverage buffer at block 410. This may include taking the union of the values, the average of the values, or other combination of the two values. If the value in pixel memory is fill (e.g., 1), then the fragment is discarded at block 412, as fill fragments take precedence of anti-aliasing fragments.

Returning to block 404, if the computed coverage value is fill (e.g., 1), then processing proceeds to block 414 where the pixel memory (e.g., the frame buffer) is read. If the value for the corresponding pixel in pixel memory is 'none' (e.g., 0) then the coverage value computed at block 404 is written to the coverage buffer at block 416. In this case, because the coverage value is fill, the value written to the coverage buffer is 1. If the value in pixel memory is an AA value (e.g., between 0 and 1), then the existing value in pixel memory is overwritten at block 416 with the fill value computed at block 404, as fill values take precedence over anti-aliasing values. If the value in pixel memory is fill (e.g., 1), then the fragment is discarded and the value in pixel memory for this pixel is cleared at block 418. As discussed above, the triangles calculated for a given input vector geometry may be overlapping. To resolve these overlaps, any area that is overlapped an even number of times is discarded as being outside the shape, and any area that is overlapped an odd number of times is kept as being inside the shape. Accordingly, if there is already a fill value in memory, and another fill fragment is read, then there are an even number of overlaps and the memory is cleared. If subsequently another fill fragment is read, then there are an odd number of overlaps and the value is written to the pixel memory.

After the coverage fragments have been read, a marker is read from memory and subsequent fragments are color fragments. Returning to block 402, if a color fragment is read then processing proceeds to block 420 where the coverage value is read from the coverage buffer. At block 422, the coverage value is multiplied by, or otherwise combined with, the color value of the color fragment and the result is written to the color buffer. At block 424, the coverage buffer is cleared to prepare for the next set of fragments associated with the next draw call in the vertex buffer. Processing may continue through the state machine until all sets of coverage and color fragments have been processed.

Figure 5:
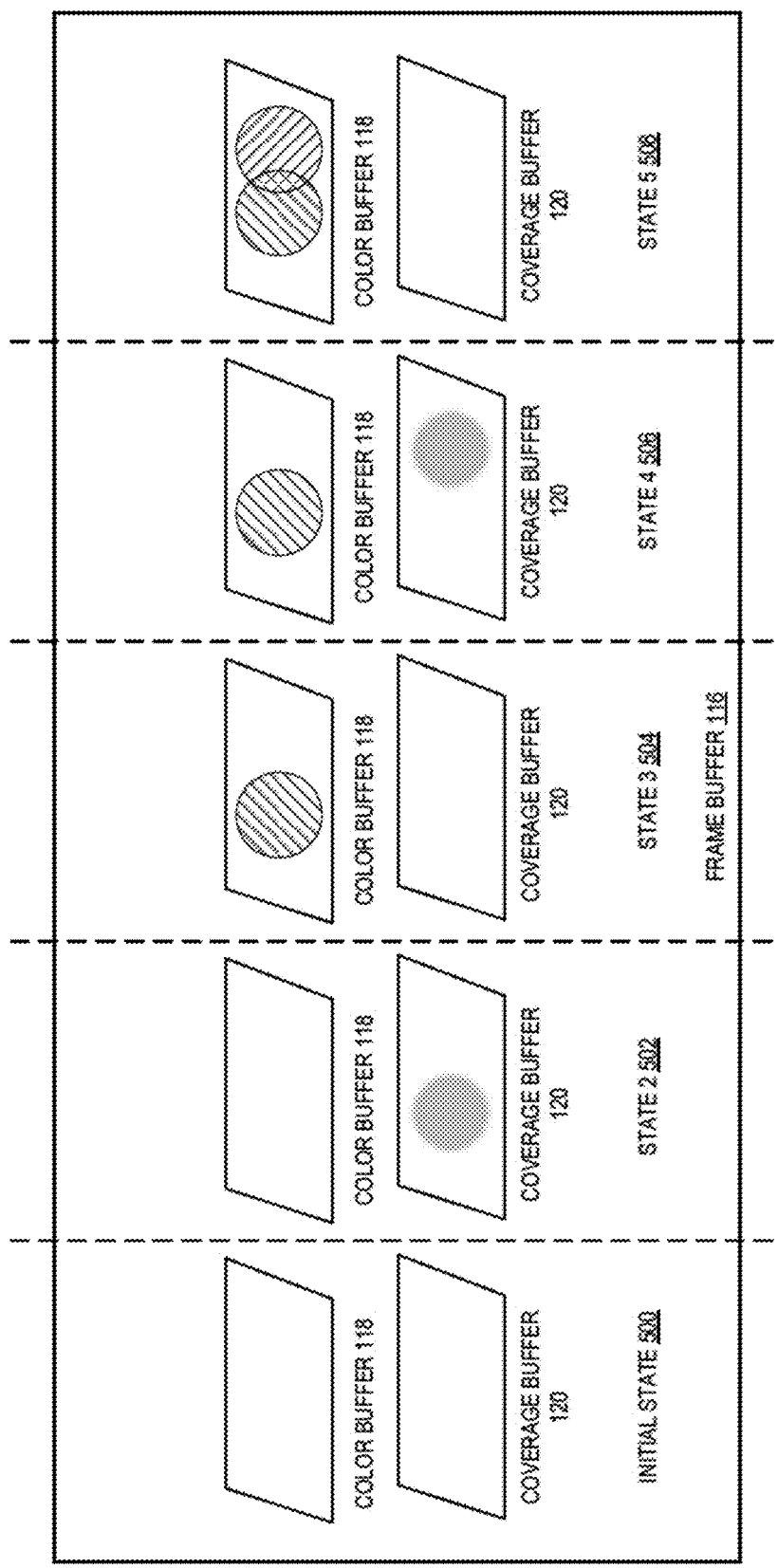
FIG. 5 illustrates an example of frame buffer states during a single pass rendering of vector graphics in accordance with one or more embodiments.

FIG. 5 illustrates an example of frame buffer states during a single pass rendering of vector graphics in accordance with one or more embodiments. As shown in FIG. 5, when a frame buffer, and the color buffer 118 and coverage buffer 120 attachments are allocated, their initial states are empty, as depicted at initial state 500. As coverage fragments are read by a fragment shader, the coverage values are computed and written to coverage buffer 120 or discarded, based on the state machine described above with respect to FIG. 4. This results in coverage buffer 120 at state 2, 502, which depicts a circle. The coverage values inside the circle are 1 (e.g., Fill) and depicted as grey and the edges of the circle are anti-aliasing coverage values between 0-1, resulting in the depicted fuzzy appearance. The remainder of the coverage buffer includes fragments that fall outside of the shape and therefore have a value of 0 (e.g., none).

Once coverage fragments have been read, the color fragments are read. As discussed, the color fragments are always appended to the end of the coverage fragments (with a marker in between to indicate the change in fragment type). As discussed above, when a color fragment is read, the coverage value is read from the coverage buffer 120 and multiplied by the color value, the result is written to color buffer 118 as shown in state 3 504. This results in an anti-aliased shape with its final color in the color buffer. In this example, the final color is depicted via hatching pattern.

Additionally, as shown in state 3 504, the coverage buffer 120 has been cleared. This readies the coverage buffer for coverage from an additional object being rendered which overlaps with the first object. As shown at state 4 506, the coverage fragments for the draw call associated with the second object to be rendered are read from the vertex buffer. As discussed, the coverage fragments for the second draw call are appended to the color fragments from the first draw call with a marker written in between to indicate the change in fragment types. Processing then proceeds as described above, with coverage values for the second object being written to the coverage buffer based on the state machine described above. Subsequently, the color fragments are read and multiplied by the coverage values and the result is written to color buffer 118 as shown at state 5 508. For overlapping portions, the overlapping color values may be merged, or the color values of a later rendered object may overwrite the color values of an earlier written object. For example, the vertex data for object may be added to the vertex buffer in their z (e.g., depth) order, such that background objects are added first followed by foreground objects.

Figure 6:
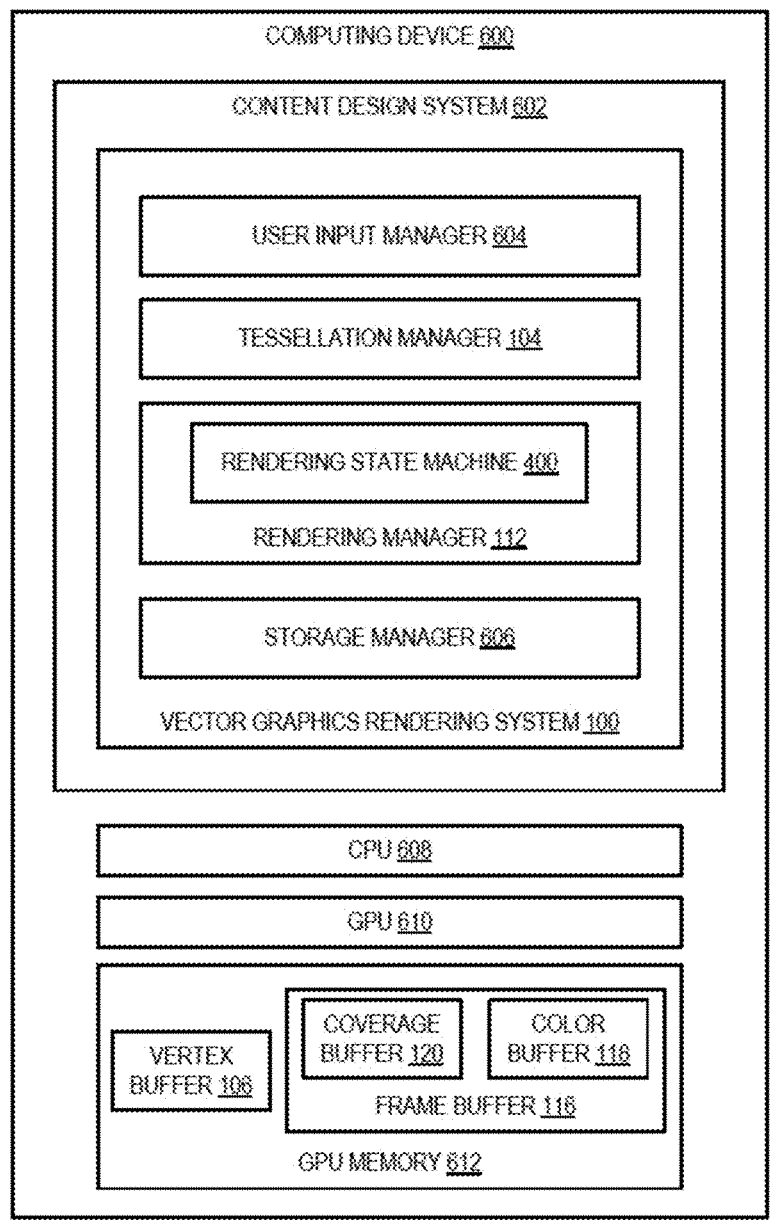
FIG. 6 illustrates a schematic diagram of a content design system in accordance with one or more embodiments.

FIG. 6 illustrates a schematic diagram of a content design system in accordance with one or more embodiments. In particular, FIG. 6 shows a schematic diagram of the rendering system 100, a computing device 600, and the content design system 602. In one or more embodiments, some or all of the components of the rendering system 100 can be implemented separately from the content design system 602 and the computing device 600. For example, as discussed further below, all or portions of the rendering system may be implemented on a server computing device.

As shown, the editing system includes a user input manager 604, the tessellation manager 104, the rendering manager 112 which includes the rendering state machine 400, and a storage manager 606. In some embodiments, the content design system 602 may be implemented as program code and/or data structures stored in a memory and executed using one or more CPUs 608 or GPUs 610 of computing device 600. As discussed, GPU 610 can include memory 612 (e.g., dedicated memory included as part of a graphics card, external graphics card, or other dedicated GPU or accelerator, or system memory accessible to the GPU 610) that can be allocated to a vertex buffer 106, frame buffer 116, and frame buffer attachments color buffer 118 and coverage buffer 120, as discussed above.

As illustrated in FIG. 6, the content design system 602 includes user input manager 604 that allows users to provide input to the content design system. For example, the user input manager 604 allows users to select one or more vector graphics-based objects to edit, move, etc. In some embodiments, the user input manager 604 enables a user to select one or more vector graphics files stored or accessible by storage manager 606 to view and/or edit.

As illustrated in FIG. 6, the content design system 602 also includes tessellation manager 104. In general, the tessellation manager 104 determines, generates, computes, estimates, and/or calculates one or more coverage triangles (or other primitives) and color triangles (or other primitives) for a vector graphics object, such as a segment of a cubic Bezier spline, a line, or more complex geometry. As discussed, the tessellation manager can generate multiple overlapping coverage triangles for a given vector graphics object and the rendering of the overlapping areas is resolved during rendering by rendering manager 112. The coverage triangles may include control triangles which include segments of the vector graphics object and interior triangles which do not.

The tessellation manager 104 can generate a control triangle that includes an interior side and two exterior sides. In particular, the tessellation manager 104 generates an interior side that connects a base point (e.g., start point or end point) to a split point within the segment portion. If the segment includes a maximum point, the interior side of the control triangle lies under the segment portion. Otherwise, if the segment portion includes a minimum point, the interior side of the control triangle lies above the segment portion. The exterior sides of a control triangle are tangent to the base point and split point and meet at a bisected point. Similarly, the tessellation manager 104 determines, generates, computes, estimates, and/or calculates one or more interior triangles for a vector graphics object. For example, the tessellation manager 104 generates an interior triangle for each segment portion based on an inner point of a segment, as described above. Likewise, the tessellation manager 104 determines, generates, computes, estimates, and/or calculates a pair of color triangles for the vector graphics object. As discussed, a bounding box can be generated that encompasses the vector graphics object and is bisected along a diagonal to form two color triangles.

In addition, the tessellation manager 104 can store information about coverage triangles and color triangles, via the storage manager 606. For example, the tessellation manager 104 stores the vertices and coordinates of coverage triangles and color triangles for a vector graphics object in a vertex buffer 106. the information can be packed in the vertex buffer such that the color triangle information is appended to the end of the coverage triangle information. The coverage and color triangle information associated with multiple draw calls may be similarly packed, with color triangle information following coverage triangle information.

As illustrated in FIG. 6, the content design system 602 also includes rendering manager 112. In general, rendering manager 112 marks, fills in, textures, and/or colors pixels of a vector graphics object using rendering state machine 400 and the triangle information generated by tessellation manager 104. For example, the rendering manager 112 uses control triangles, interior triangles, and color triangles to render a vector graphics object using the rendering state machine based on a current state of frame buffer 116 and a type of fragment being processed. As discussed, the rendering manager can rasterize the coverage triangles and color triangles into fragments and use a fragment shader of the GPU 610 to process the resulting coverage fragments and color fragments using rendering state machine 400, as discussed above with respect to FIG. 5. For example, in a single pass, coverage fragments are processed, and their coverage values are written to coverage buffer 120. After coverage fragments have been processed for a given draw call, the color fragments, which were appended to follow the coverage fragments, are processed. For each color fragment, the color value is multiplied by the coverage value from coverage buffer 120 and the result is written to color buffer 118. Once the draw calls have been processed the color buffer is written to the frame buffer to be rendered on a display.

In one or more embodiments, the tessellation manager 104 uses the CPU 608 of the computing device 600 to generate the coverage and color triangles described above. In addition, the CPU stores the triangle information in memory via the storage manager 606 before uploading the triangle information from the memory to the vertex buffer of the GPU memory 612. The GPU of the computing device 600 accesses the memory via the storage manager 606 and renders the vector geometry using the rendering state machine 400 of rendering manager 112.

As illustrated in FIG. 6, the content design system 602 also includes a storage manager 606. In general, the storage manager 606 maintains, stores, organizes, and/or retrieves data associated with the rendering system 100. For example, the storage manager 606 stores triangle information, fragment information, etc., as described above. Further, the storage manager 606 communicates with other components of the rendering system 100 to facilitate efficient rendering of vector graphics objects.

Each of the components 604-612 of the content design system 602 and their corresponding elements (as shown in FIG. 6) may be in communication with one another using any suitable communication technologies. It will be recognized that although components 604-612 and their corresponding elements are shown to be separate in FIG. 6, any of components 604-612 and their corresponding elements may be combined into fewer components, such as into a single facility or module, divided into more components, or configured into different components as may serve a particular embodiment.

The components 604-612 and their corresponding elements can comprise software, hardware, or both. For example, the components 604-612 and their corresponding elements can comprise one or more instructions stored on a computer-readable storage medium and executable by processors of one or more computing devices. When executed by the one or more processors, the computer-executable instructions of the content design system 602 can cause a client device and/or a server device to perform the methods described herein. Alternatively, the components 604-612 and their corresponding elements can comprise hardware, such as a special purpose processing device to perform a certain function or group of functions. Additionally, the components 604-612 and their corresponding elements can comprise a combination of computer-executable instructions and hardware.

Furthermore, the components 604-612 of the content design system 602 may, for example, be implemented as one or more stand-alone applications, as one or more modules of an application, as one or more plug-ins, as one or more library functions or functions that may be called by other applications, and/or as a cloud-computing model. Thus, the components 604-612 of the content design system 602 may be implemented as a stand-alone application, such as a desktop or mobile application. Furthermore, the components 604-612 of the content design system 602 may be implemented as one or more web-based applications hosted on a remote server. Alternatively, or additionally, the components of the content design system 602 may be implemented in a suit of mobile device applications or "apps." To illustrate, the components of the content design system 602 may be implemented in a digital image editing application, including but not limited to ADOBE® ILLUSTRATOR®, ADOBE® XD, ADOBE® POSTSCRIPT®, or ADOBE® ACROBAT®. "ADOBE," "ILLUSTRATOR," "POSTSCRIPT," and "ACROBAT" are either registered trademarks or trademarks of Adobe Inc. in the United States and/or other countries.

Performance of embodiments disclosed herein have been experimentally compared to conventional approaches. As shown in the tables below, use of embodiments for rendering artwork gain significant performance improvements. For example, in the tables below the performance of a standard implementation of CPU tessellation-based technique if compared to an embodiment of the techniques disclosed herein. As shown, the first frame draw times improved by between 3.64 and 6.85 times when GPU buffers are not cached over the conventional approach. This corresponds to increased editing workflow performances. Also, embodiments are at par or better performing in frame redraws (e.g., zoom in/out workflows) when there are no changes in geometry and a cached triangle buffer can be redrawn directly on the GPU.

| First Frame Draw Time (w/o cache): | | | |
| --- | --- | --- | --- |
| Files | Prior Solution | Our Solution | Gain |
| Ellipses2.svg | 197.4 | 28.8 | 6.85× |
| Flower.svg | 220.5 | 50.9 | 4.33× |
| 64-tigers.svg | 1038.4 | 284.9 | 3.64× |

| Frame Redraw Time (with cache): | | | |
| --- | --- | --- | --- |
| Files | Prior Solution | Our Solution | Gain |
| Ellipses2.svg | 18.3 | 9.6 | 1.91× |
| Flower.svg | 57 | 36.6 | 1.56× |
| 64-tigers.svg | 81.7 | 90.3 | 0.90× |

Figure 7:
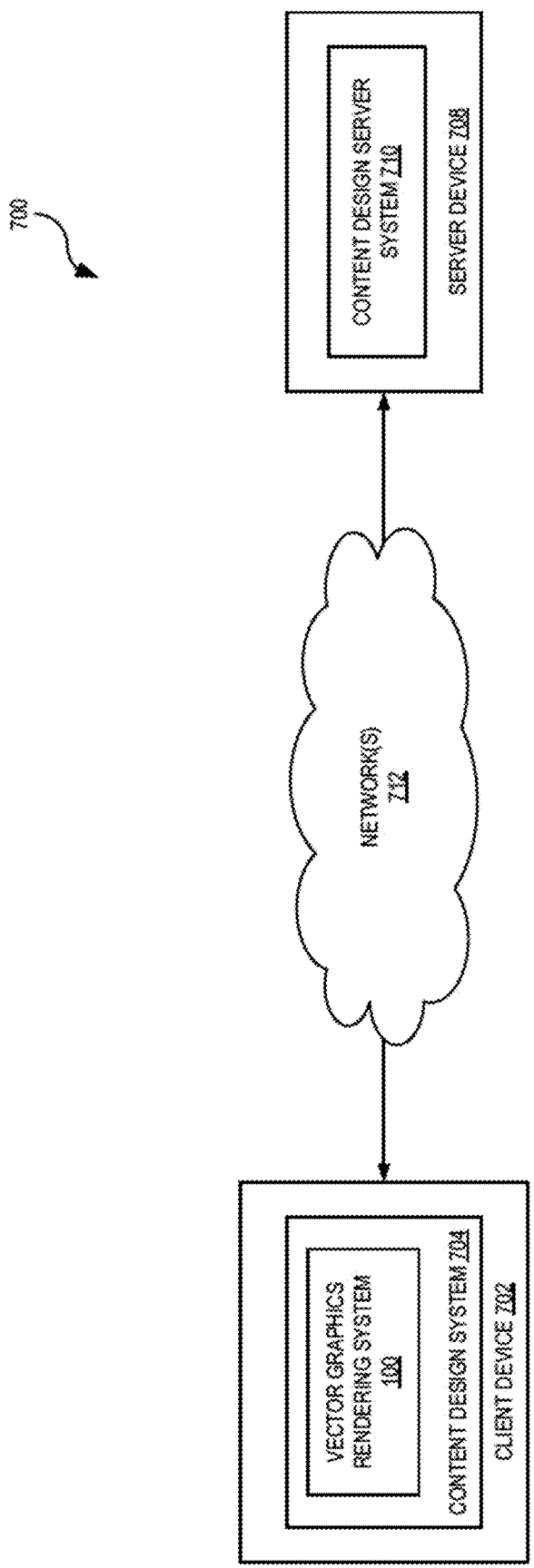
FIG. 7 illustrates a schematic diagram of an exemplary environment in which a content design system can be implemented in accordance with one or more embodiments.

FIG. 7 illustrates a schematic diagram of an exemplary environment 700 in which a content design system can be implemented in accordance with one or more embodiments. In one or more embodiments, the exemplary environment 700 includes a client device 702, a server device 708, and one or more networks 712. The network(s) 712 can be any suitable network over which the computing devices can communicate. Example and features of computing devices (e.g., the client device 702 and the server device 708) and networks (e.g., network(s) 712) are discussed in more detail below with regard to FIGS. 9-10.

As illustrated in FIG. 7, the environment 700 includes the client device 702 having a content design system 704 as well as the vector graphics rendering system 100 (or simply "rendering system" 100). The content design system 704 generally facilitates the creation, modification, sharing, and/or deletion of graphical content including vector-based content. In one or more embodiments, the content design system 704 may be a design application such as ADOBE® ILLUSTRATOR®, ADOBE® POSTSCRIPT®, ADOBE® ACROBAT®, ADOBE® XD, etc. In other embodiments, the content design system 704 includes multiple applications, functions, and operations relating to graphical content, such as an application suite, a web-based application and/or system operations on the client device 702.

As shown in FIG. 7, the content design system 704 includes the rendering system 100. In some embodiments, however, the rendering system 100 is located on the client device apart from the content design system 704. As mentioned above, the rendering system 100 renders vector graphics efficiently in a single pass using various approaches and techniques. For example, a rendering state machine implemented by a fragmentation shader of a graphics pipeline can be used to efficiently render vector graphics, as discussed above.

In addition, the environment 700 includes the server device 708. The server device 708 can generate, store, receive, and transmit any type of data, including vector graphic content. As shown, the server device 708 includes a content design server system 710 that communicates with the content design system 704 on the client device 702. For example, the content design server system 710 transmits vector graphic content to the client device 702, which enables the client device 702 to edit the vector graphic content which is then efficiently rendered using the techniques described herein. Notably, while only a single server device is shown, the content design server system 710 can be implemented across multiple server devices.

While not illustrated, in one or more embodiments, the server device 708 can include all, or a portion of, the rendering system 100, such as within the content design server system 710. For example, when located in the server device 708, the rendering system 100 can comprise an application running on the server device 708 or a portion of a software application that can be downloaded to the client device 702. For instance, the rendering system 100 includes a web hosting application that allows the client device 702 to interact with content from the content design server system 710 hosted at the server device 708.

Figure 8:
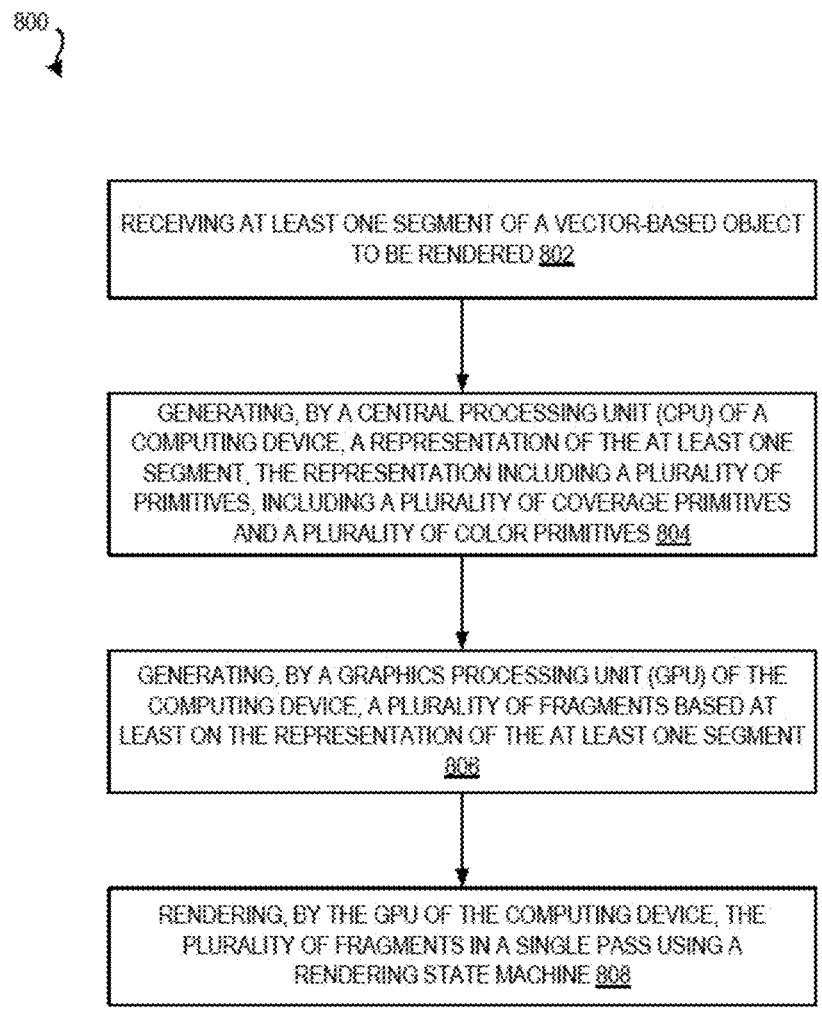
FIG. 8 illustrates a flowchart of a series of acts in a method of single pass vector graphics rendering in accordance with one or more embodiments.

FIGS. 1-7, the corresponding text, and the examples, provide a number of different systems and devices that allows a user to facilitate selection of target individuals within digital visual media. In addition to the foregoing, embodiments can also be described in terms of flowcharts comprising acts and steps in a method for accomplishing a particular result. For example, FIG. 8 illustrates flowcharts of exemplary methods in accordance with one or more embodiments. The methods described in relation to FIG. 8 may be performed with less or more steps/acts or the steps/acts may be performed in differing orders. Additionally, the steps/acts described herein may be repeated or performed in parallel with one another or in parallel with different instances of the same or similar steps/acts.

FIG. 8 illustrates a flowchart of a series of acts in a method of single pass vector graphics rendering in accordance with one or more embodiments. In one or more embodiments, the method 800 is performed in a digital medium environment that includes the content design system 84. The method 800 is intended to be illustrative of one or more methods in accordance with the present disclosure and is not intended to limit potential embodiments. Alternative embodiments can include additional, fewer, or different steps than those articulated in FIG. 8.

As illustrated in FIG. 8, the method 800 includes an act 802 of receiving at least one segment of a vector-based object to be rendered. For example, the user can make an edit to a vector-based object in a drawing in a content design application. The edits can be received by a user input manager as discussed above and the resulting change can trigger the rendering of the newly modified object.

As illustrated in FIG. 8, the method 800 includes an act 804 of generating, by a central processing unit (CPU) of a computing device, a representation of the at least one segment, the representation including a plurality of primitives, including a plurality of coverage primitives and a plurality of color primitives. As discussed, a tessellation manager can instruct the CPU to tessellate the at least one segment using a plurality of primitives. The primitives may include triangles, as generally discussed herein, but may alternatively use other polygons or other primitives which a GPU is configured to process.

As illustrated in FIG. 8, the method 800 includes an act 806 of generating, by a graphics processing unit (GPU) of the computing device, a plurality of fragments based at least on the representation of the at least one segment. In some embodiments, the method may further include storing the plurality of primitives in a contiguous region of linear memory of a computing device, wherein the plurality of coverage primitives is stored followed by the plurality of color primitives. As discussed, this may be a vertex buffer in which the triangles are packed as discussed above with respect to FIG. 3. The plurality of primitives can be uploaded to GPU memory and a rendering manager can instruct a rasterizer of the GPU to rasterize the primitives which produces the plurality of fragments, each fragment corresponding to a pixel of a display.

As illustrated in FIG. 8, the method 800 includes an act 808 of rendering, by the GPU of the computing device, the plurality of fragments in a single pass using a rendering state machine. In some embodiments, rendering by the GPU, may further include determining, by the rendering state machine, that a first fragment is a coverage fragment, and computing, by the rendering state machine, a coverage value for the first fragment. In some embodiments, the method may further include discarding the first fragment if the coverage value is 0.

In some embodiments, the method may include reading a current value for a pixel in a frame buffer corresponding to the first fragment if coverage value is 1. In some embodiments, the method may include writing the coverage value to the pixel in the frame buffer corresponding to the first fragment if the current value is 0 or a value between 0 and 1, exclusive, or clearing the pixel in the frame buffer corresponding to the first fragment is the current value is 1.

In some embodiments, the method may include reading a current value for a pixel in a frame buffer corresponding to the first fragment if coverage value is between 0 and 1, exclusive, wherein the coverage value is calculated based on a signed distance between the pixel and the at least one segment. In some embodiments, the method may include writing the coverage value to the pixel in the frame buffer corresponding to the first fragment if the current value is 0, or discarding the first fragment if the current value is 1. In some embodiments, the method may include merging the coverage value and the current value to create a merged value, and writing a merged value to the pixel in the frame buffer corresponding to the first fragment if the current value is a value between 0 and 1, exclusive.

In some embodiments, the method may include rendering, by the GPU of the computing device, the plurality of fragments in a single pass using a rendering state machine further comprises determining, by the rendering state machine, that a first fragment is a color fragment, reading, by the rendering state machine, a coverage value from a coverage buffer for a pixel corresponding to the first fragment, multiplying, by the rendering state machine, the coverage value by a color value associated with the first fragment to calculate a combined value, writing, by the rendering state machine, the combined value to a color buffer, and clearing, by the rendering state machine, the coverage buffer.

Figure 9:
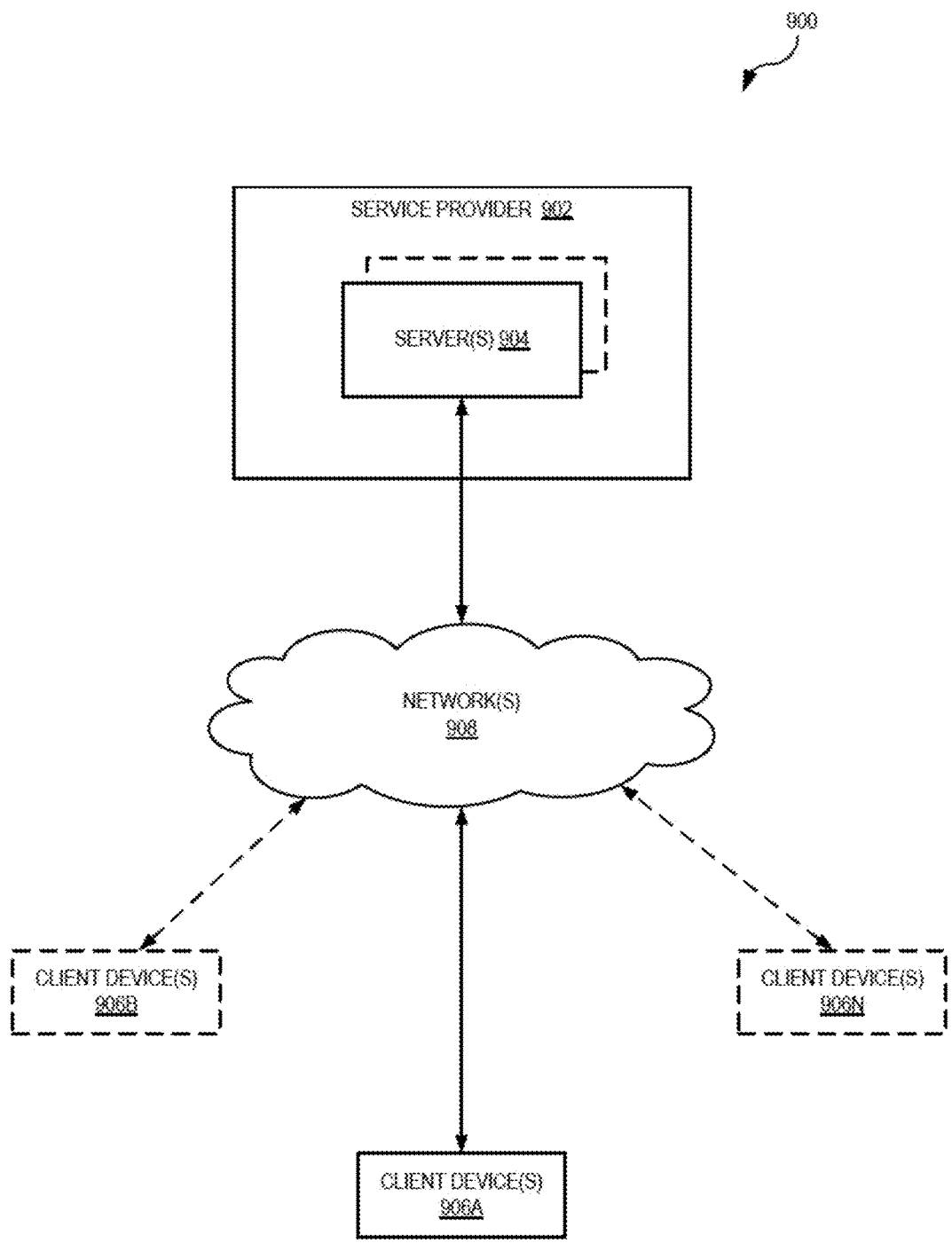
FIG. 9 illustrates a schematic diagram of an exemplary environment in which the content design system can operate in accordance with one or more embodiments.

FIG. 9 illustrates a schematic diagram of an exemplary environment 900 in which the content design system 602 can operate in accordance with one or more embodiments. In one or more embodiments, the environment 900 includes a service provider 902 which may include one or more servers 904 connected to a plurality of client devices 906A-906N via one or more networks 908. The client devices 906A-906N, the one or more networks 908, the service provider 902, and the one or more servers 904 may communicate with each other or other components using any communication platforms and technologies suitable for transporting data and/or communication signals, including any known communication technologies, devices, media, and protocols supportive of remote data communications, examples of which will be described in more detail below with respect to FIG. 10.

Although FIG. 9 illustrates a particular arrangement of the client devices 906A-906N, the one or more networks 908, the service provider 902, and the one or more servers 904, various additional arrangements are possible. For example, the client devices 906A-906N may directly communicate with the one or more servers 904, bypassing the network 908. Or alternatively, the client devices 906A-906N may directly communicate with each other. The service provider 902 may be a public cloud service provider which owns and operates their own infrastructure in one or more data centers and provides this infrastructure to customers and end users on demand to host applications on the one or more servers 904. The servers may include one or more hardware servers (e.g., hosts), each with its own computing resources (e.g., processors, memory, disk space, networking bandwidth, etc.) which may be securely divided between multiple customers, each of which may host their own applications on the one or more servers 904. In some embodiments, the service provider may be a private cloud provider which maintains cloud infrastructure for a single organization. The one or more servers 904 may similarly include one or more hardware servers, each with its own computing resources, which are divided among applications hosted by the one or more servers for use by members of the organization or their customers.

Similarly, although the environment 900 of FIG. 9 is depicted as having various components, the environment 900 may have additional or alternative components. For example, the environment 900 can be implemented on a single computing device with the content design system 602. In particular, the content design system 602 may be implemented in whole or in part on the client device 902A.

As illustrated in FIG. 9, the environment 900 may include client devices 906A-906N. The client devices 906A-906N may comprise any computing device. For example, client devices 906A-906N may comprise one or more personal computers, laptop computers, mobile devices, mobile phones, tablets, special purpose computers, TVs, or other computing devices, including computing devices described below with regard to FIG. 10. Although three client devices are shown in FIG. 9, it will be appreciated that client devices 906A-906N may comprise any number of client devices (greater or smaller than shown).

Moreover, as illustrated in FIG. 9, the client devices 906A-906N and the one or more servers 904 may communicate via one or more networks 908. The one or more networks 908 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 908 may be any suitable network over which the client devices 906A-906N may access service provider 902 and server 904, or vice versa. The one or more networks 908 will be discussed in more detail below with regard to FIG. 10.

In addition, the environment 900 may also include one or more servers 904. The one or more servers 904 may generate, store, receive, and transmit any type of data. For example, a server 904 may receive data from a client device, such as the client device 906A, and send the data to another client device, such as the client device 902B and/or 902N. The server 904 can also transmit electronic messages between one or more users of the environment 900. In one example embodiment, the server 904 is a data server. The server 904 can also comprise a communication server or a web-hosting server. Additional details regarding the server 904 will be discussed below with respect to FIG. 10.

As mentioned, in one or more embodiments, the one or more servers 904 can include or implement at least a portion of the content design system 602. In particular, the content design system 602 can comprise an application running on the one or more servers 904 or a portion of the content design system 602 can be downloaded from the one or more servers 904. For example, the content design system 602 can include a web hosting application that allows the client devices 906A-906N to interact with content hosted at the one or more servers 904. To illustrate, in one or more embodiments of the environment 900, one or more client devices 906A-906N can access a webpage supported by the one or more servers 904. In particular, the client device 906A can run a web application (e.g., a web browser) to allow a user to access, view, and/or interact with a webpage or website hosted at the one or more servers 904.

Upon the client device 906A accessing a webpage or other web application hosted at the one or more servers 904, in one or more embodiments, the one or more servers 904 can provide access to one or more digital images (e.g., vector graphics files) stored at the one or more servers 904. Moreover, the client device 906A can receive a request (i.e., via user input) to edit a vector graphics object, and provide the request to the one or more servers 904. Upon receiving the request, the one or more servers 904 can automatically perform at least some the methods and processes described above to prepare the vector graphics for rendering by the client device.

As just described, the content design system 602 may be implemented in whole, or in part, by the individual elements 902-908 of the environment 900. It will be appreciated that although certain components of the content design system 602 are described in the previous examples with regard to particular elements of the environment 900, various alternative implementations are possible. For instance, in one or more embodiments, the content design system 602 is implemented on any of the client devices 906A-N. Similarly, in one or more embodiments, the content design system 602 may be implemented on the one or more servers 904. Moreover, different components and functions of the content design system 602 may be implemented separately among client devices 906A-906N, the one or more servers 904, and the network 908.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
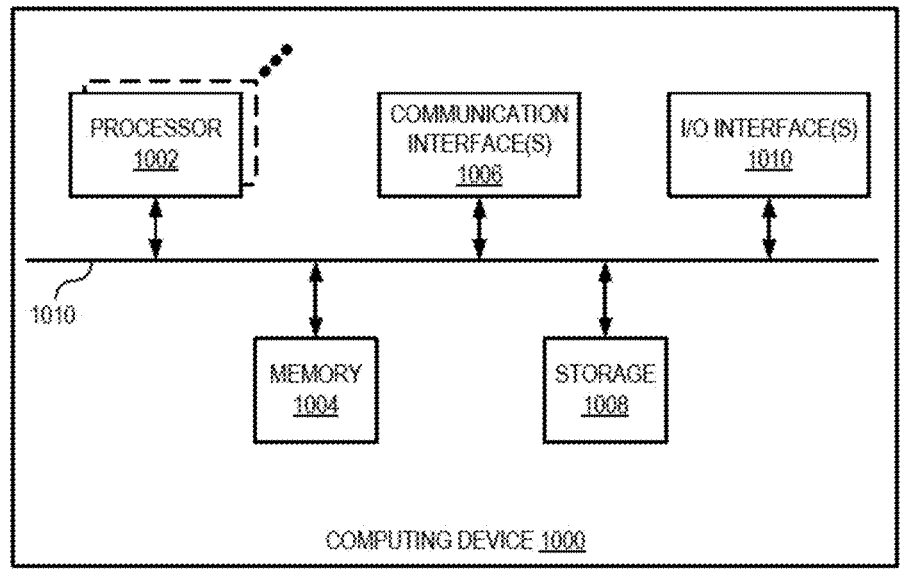
FIG. 10 illustrates a block diagram of an exemplary computing device in accordance with one or more embodiments.

FIG. 10 illustrates, in block diagram form, an exemplary computing device 1000 that may be configured to perform one or more of the processes described above. One will appreciate that one or more computing devices such as the computing device 1000 may implement the content design system. As shown by FIG. 10, the computing device can comprise a processor 1002, memory 1004, one or more communication interfaces 1006, a storage device 1008, and one or more I/O devices/interfaces 1010. In certain embodiments, the computing device 1000 can include fewer or more components than those shown in FIG. 10. Components of computing device 1000 shown in FIG. 10 will now be described in additional detail.

In particular embodiments, processor(s) 1002 includes hardware for executing instructions, such as those making up a computer program. As an example, and not by way of limitation, to execute instructions, processor(s) 1002 may retrieve (or fetch) the instructions from an internal register, an internal cache, memory 1004, or a storage device 1008 and decode and execute them. In various embodiments, the processor(s) 1002 may include one or more central processing units (CPUs), graphics processing units (GPUs), field programmable gate arrays (FPGAs), systems on chip (SoC), or other processor(s) or combinations of processors.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1004 may be internal or distributed memory.

The computing device 1000 can further include one or more communication interfaces 1006. A communication interface 1006 can include hardware, software, or both. The communication interface 1006 can provide one or more interfaces for communication (such as, for example, packet-based communication) between the computing device and one or more other computing devices 1000 or one or more networks. As an example and not by way of limitation, communication interface 1006 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can comprise hardware, software, or both that couples components of computing device 1000 to each other.

The computing device 1000 includes a storage device 1008 includes storage for storing data or instructions. As an example, and not by way of limitation, storage device 1008 can comprise a non-transitory storage medium described above. The storage device 1008 may include a hard disk drive (HDD), flash memory, a Universal Serial Bus (USB) drive or a combination these or other storage devices.

The computing device 1000 also includes one or more input or output ("I/O") devices/interfaces 1010, which are provided to allow a user to provide input to (such as user strokes), receive output from, and otherwise transfer data to and from the computing device 1000. These I/O devices/interfaces 1010 may include a mouse, keypad or a keyboard, a touch screen, camera, optical scanner, network interface, modem, other known I/O devices or a combination of such I/O devices/interfaces 1010. The touch screen may be activated with a stylus or a finger.

The I/O devices/interfaces 1010 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1010 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A computer-implemented method comprising:
    receiving at least one segment of a vector-based object to be rendered;
    generating, by a central processing unit (CPU) of a computing device, a representation of the at least one segment, the representation including a plurality of primitives, including a plurality of coverage primitives defining a shape of the at least one segment and a pair of color primitives defining a color of the at least one segment;
    generating, by a graphics processing unit (GPU) of the computing device, a plurality of fragments based at least on the representation of the at least one segment; and rendering, by the GPU of the computing device, the plurality of fragments in a single pass using a rendering state machine.

2. The computer-implemented method of claim 1, wherein rendering, by the GPU of the computing device, the plurality of fragments in a single pass using a rendering state machine further comprises:
 determining, by the rendering state machine, that a first fragment is a coverage fragment; and
 computing, by the rendering state machine, a coverage value for the first fragment.

3. The computer-implemented method of claim 2, further comprising:
 discarding the first fragment if the coverage value is 0.

4. The computer-implemented method of claim 2, further comprising:
 reading a current value for a pixel in a frame buffer corresponding to the first fragment if coverage value is 1.

5. The computer-implemented method of claim 4, further comprising:
 writing the coverage value to the pixel in the frame buffer corresponding to the first fragment if the current value is 0 or a value between 0 and 1, exclusive; or
 clearing the pixel in the frame buffer corresponding to the first fragment if the current value is 1.

6. The computer-implemented method of claim 2, further comprising:
 reading a current value for a pixel in a frame buffer corresponding to the first fragment if coverage value is between 0 and 1, exclusive, wherein the coverage value is calculated based on a signed distance between the pixel and the at least one segment.

7. The computer-implemented method of claim 6, further comprising:
 writing the coverage value to the pixel in the frame buffer corresponding to the first fragment if the current value is 0; or
 discarding the first fragment if the current value is 1.

8. The computer-implemented method of claim 7, further comprising:
 merging the coverage value and the current value to create a merged value; and
 writing a merged value to the pixel in the frame buffer corresponding to the first fragment if the current value is a value between 0 and 1, exclusive.

9. The computer-implemented method of claim 1, further comprising:
 storing the plurality of primitives in a contiguous region of linear memory of a computing device, wherein the plurality of coverage primitives is stored followed by the plurality of color primitives.

10. The computer-implemented method of claim 1, wherein rendering, by the GPU of the computing device, the plurality of fragments in a single pass using a rendering state machine further comprises:
 determining, by the rendering state machine, that a first fragment is a color fragment;
 reading, by the rendering state machine, a coverage value from a coverage buffer for a pixel corresponding to the first fragment;
 multiplying, by the rendering state machine, the coverage value by a color value associated with the first fragment to calculate a combined value;
 writing, by the rendering state machine, the combined value to a color buffer; and
 clearing, by the rendering state machine, the coverage buffer.

11. A non-transitory computer-readable storage medium including instructions stored thereon which, when executed by at least one processor, cause the at least one processor to:
 receive at least one segment of a vector-based object to be rendered;
 generate, by a central processing unit (CPU) of a computing device, a representation of the at least one segment, the representation including a plurality of primitives, including a plurality of coverage primitives defining a shape of the at least one segment and a pair of color primitives defining a color of the at least one segment;
 generate, by a graphics processing unit (GPU) of the computing device, a plurality of fragments based at least on the representation of the at least one segment; and
 render, by the GPU of the computing device, the plurality of fragments in a single pass using a rendering state machine.

12. The non-transitory computer-readable storage medium of claim 11, wherein the instructions to render, by the GPU of the computing device, the plurality of fragments in a single pass using a rendering state machine, when executed, further cause the at least one processor to:
 determine, by the rendering state machine, that a first fragment is a coverage fragment; and
 compute, by the rendering state machine, a coverage value for the first fragment.

13. The non-transitory computer-readable storage medium of claim 12, wherein the instructions, when executed, further cause the at least one processor to:
 read a current value for a pixel in a frame buffer corresponding to the first fragment if coverage value is 1.

14. The non-transitory computer-readable storage medium of claim 13, wherein the instructions, when executed, further cause the at least one processor to:
 write the coverage value to the pixel in the frame buffer corresponding to the first fragment if the current value is 0 or a value between 0 and 1, exclusive; or
 clear the pixel in the frame buffer corresponding to the first fragment if the current value is 1.

15. The non-transitory computer-readable storage medium of claim 12, wherein the instructions, when executed, further cause the at least one processor to:
 read a current value for a pixel in a frame buffer corresponding to the first fragment if coverage value is between 0 and 1, exclusive, wherein the coverage value is calculated based on a signed distance between the pixel and the at least one segment.

16. The non-transitory computer-readable storage medium of claim 15, wherein the instructions, when executed, further cause the at least one processor to:
 write the coverage value to the pixel in the frame buffer corresponding to the first fragment if the current value is 0; or
 discard the first fragment if the current value is 1.

17. The non-transitory computer-readable storage medium of claim 15, wherein the instructions, when executed, further cause the at least one processor to:
 merge the coverage value and the current value to create a merged value; and
 write the merged value to the pixel in the frame buffer corresponding to the first fragment if the current value is a value between 0 and 1, exclusive.

18. The non-transitory computer-readable storage medium of claim 11, wherein the instructions to render, by the GPU of the computing device, the plurality of fragments in a single pass using a rendering state machine, when executed, further cause the at least one processor to:
  determine, by the rendering state machine, that a first fragment is a color fragment;
  read, by the rendering state machine, a coverage value from a coverage buffer for a pixel corresponding to the first fragment;
  multiply, by the rendering state machine, the coverage value by a color value associated with the first fragment to calculate a combined value;
  write, by the rendering state machine, the combined value to a color buffer; and
  clear, by the rendering state machine, the coverage buffer.

19. A system comprising:
  a computing device including a memory, at least one central processing unit (CPU), and at least one tile-based graphics processing unit (GPU), the computing device implementing a vector graphics rendering system,
  wherein the memory includes instructions stored thereon which, when executed, cause the vector graphics rendering system to:
    receive at least one segment of a vector-based object to be rendered;
    generate, by the at least one CPU, a representation of the at least one segment, the representation including a plurality of primitives, including a plurality of coverage primitives defining a shape of the at least one segment and a pair of color primitives defining a color of the at least one segment;
    generate, by the at least one GPU, a plurality of fragments based at least on the representation of the at least one segment; and
    render, by the at least one GPU, the plurality of fragments in a single pass using a rendering state machine.

20. The system of claim 19, wherein the instructions to render, by the GPU, the plurality of fragments in a single pass using a rendering state machine, when executed, further causes the computing device to:
  determine, by the rendering state machine, that a first fragment is a coverage fragment;
  compute, by the rendering state machine, a coverage value for the first fragment;
  if the coverage value if 0 then discard, by the rendering state machine, the first fragment;
  if the coverage value is 1 or a value between 0 and 1 exclusive, then read, by the rendering state machine, a current value for a pixel in a frame buffer corresponding to the first fragment; and
  update the current value for the pixel in the frame buffer based on the coverage value and the current value for the pixel.

* * * * *